United States Patent
Pandey

(10) Patent No.: US 11,568,381 B2
(45) Date of Patent: Jan. 31, 2023

(54) APPARATUS AND METHOD FOR DYNAMIC USER/ISSUER PAIRING

(71) Applicant: Mastercard International Incorporated, Purchase, NY (US)

(72) Inventor: Anshul Pandey, Gurgaon (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 132 days.

(21) Appl. No.: 15/959,539

(22) Filed: Apr. 23, 2018

(65) Prior Publication Data

US 2018/0336546 A1  Nov. 22, 2018

(51) Int. Cl.
| | |
|---|---|
| G06Q 20/32 | (2012.01) |
| G06Q 20/36 | (2012.01) |
| G06Q 40/02 | (2012.01) |
| G06Q 30/02 | (2012.01) |
| G06Q 30/06 | (2012.01) |

(52) U.S. Cl.
CPC ......... G06Q 20/322 (2013.01); G06Q 20/367 (2013.01); G06Q 30/0207 (2013.01); G06Q 30/06 (2013.01); G06Q 40/02 (2013.01)

(58) Field of Classification Search
CPC .................................................. G06Q 20/322
See application file for complete search history.

(56) References Cited

U.S. PATENT DOCUMENTS

| | | | | |
|---|---|---|---|---|
| 8,639,629 | B1* | 1/2014 | Hoffman | G06Q 20/3821 705/64 |
| 8,768,838 | B1* | 7/2014 | Hoffman | G06Q 40/00 705/72 |
| 2003/0014353 | A1* | 1/2003 | Fitzherbert | G06Q 30/08 705/37 |
| 2006/0173963 | A1* | 8/2006 | Roseway | H04L 51/04 709/206 |

(Continued)

OTHER PUBLICATIONS

Network-based models to improve credit scoring accuracy IEEE (Year: 2018).*

(Continued)

*Primary Examiner* — Bruce I Ebersman
(74) *Attorney, Agent, or Firm* — Buckley, Maschoff & Talwalker LLC

(57) ABSTRACT

In one aspect, an apparatus for setting a dynamic user/issuer pairing is provided, comprising:
at least one processor; and
at least one memory including computer program code;
the at least one memory and the computer program code configured to, with the at least one processor, cause the apparatus at least to:
send transaction details and an account identifier to a plurality of issuer servers belonging to a corresponding plurality of issuers, the transaction details relating to a transaction initiated by a user and the account identifier identifying the user;
receive issuer fee bids submitted by one or more issuers who have received the transaction details and the (Continued)

account identifier, the one or more issuers being those available to conduct the transaction; and analyze the issuer bids based on predetermined criteria associating with the account identifier to present to the user at least one issuer among the one or more issues who have submitted the issuer bids.

14 Claims, 4 Drawing Sheets

(56) References Cited

U.S. PATENT DOCUMENTS

| | | | | |
|---|---|---|---|---|
| 2009/0076972 | A1* | 3/2009 | Witchel | G06Q 40/06 705/37 |
| 2011/0087558 | A1* | 4/2011 | Kalaboukis | G06Q 30/00 707/E17.108 |
| 2011/0208658 | A1 | 8/2011 | Makhotin | |
| 2012/0046994 | A1* | 2/2012 | Reisman | G06Q 30/02 705/7.29 |
| 2012/0130842 | A1* | 5/2012 | Giordano | G06Q 30/08 705/26.3 |
| 2012/0310831 | A1* | 12/2012 | Harris | G06Q 30/02 705/44 |
| 2015/0039506 | A1 | 2/2015 | Groarke et al. | |
| 2015/0286997 | A1* | 10/2015 | Zimmerman | G06Q 20/023 705/39 |
| 2015/0379596 | A1* | 12/2015 | Li | G06Q 10/083 705/26.2 |
| 2017/0063932 | A1 | 3/2017 | Hubbard et al. | |

OTHER PUBLICATIONS

Revealing Key Non-financial Factors for Online Credit-Scoring in e-Financing (Year: 2013).*

Behavioral segmentation of bank's Point-of-Sales using RF*M* approach (Year: 2010).*

"PCT Notification of Transmittal of the International Search Report and the Written Opinion", International Searching Authority, or the Declaration, Jul. 5, 2018, for International Application No. PCT/US2018/028497, 11 pp.

* cited by examiner

APPARATUS AND METHOD FOR DYNAMIC USER/ISSUER PAIRING

CROSS-REFERENCE TO RELATED APPLICATION

This application is a U.S. National Stage filing under 35 U.S.C. § 119, based on and claiming benefits of and priority to Singapore Patent Application No. 10201704069P filed on May 18, 2017. The entire disclosure of the above application is incorporated herein by reference.

TECHNICAL FIELD

The present invention relates broadly, but not exclusively, to apparatus and methods for pairing a user and an issuer in a dynamic manner.

BACKGROUND

With the proliferation of mobile communication devices, such as mobile telephones, financial account holders that have such devices have begun to use them to effect financial transactions.

Recently, there is an increasing and significant number of users effecting financial transactions online e.g., using the Internet or via a mobile device app program. It is known that the customers are limited to use accounts that they have with financial institutions. However, it is impossible to know about the on-going promotions that other financial institutions are holding with an appropriate user/financial institution (e.g., an issuer) match.

For example, user typically browses online, selects the products (e.g., goods and/or services) and makes payment online. This traditional payment mode can have numerous disadvantages including, for example, limited awareness of promotions that other financial institutions are holding or not knowing of other users who have good financial credibility These disadvantages can be even more problematic when user would like to save money on transaction fee or to conduct a transaction that the financial institution with whom he does not have an account.

In the recent time, financial institutions have enhanced the way in which they publicize their promotions and transaction fees. When using such websites, for example, financial institutions can post descriptions of their on-going promotions, which can then be searched by users who access the website. If a user is interested in a posted promotion, the user can contact a financial institution by opening an account with the financial institutions. Thus, these types of websites are still based on the traditional process summarized above, but with the convenience that financial institutions can post their on-going promotions, and users can review on-line available promotion and submit an application for an account using their computer.

While such web sites have provided an improved level of convenience to financial institutions and users relative to other traditional methods, known resources nevertheless suffer from a number of disadvantages and inconveniences associated with the time consuming process of posting on-line promotions, reviewing application forms mailed or submitted by users, deciding which users are good candidates after reviewing application forms, contacting those users, and going through the application process. Further, this traditional process provides limited insight to the financial credibility of a user.

A need therefore exists to provide methods for conducting a user-approved transaction using one of a plurality of accounts that addresses one or more of the above problems.

Furthermore, other desirable features and characteristics will become apparent from the subsequent detailed description and the appended claims, taken in conjunction with the accompanying drawings and this background of the disclosure.

SUMMARY

In one aspect, an apparatus for setting a dynamic user/issuer pairing is provided, comprising:
at least one processor; and
at least one memory including computer program code;
the at least one memory and the computer program code configured to, with the at least one processor, cause the apparatus at least to:
send transaction details and an account identifier to a plurality of issuer servers belonging to a corresponding plurality of issuers, the transaction details relating to a transaction initiated by a user and the account identifier identifying the user;
receive issuer fee bids submitted by one or more issuers who have received the transaction details and the account identifier, the one or more issuers being those available to conduct the transaction; and
analyze the issuer bids based on predetermined criteria associating with the account identifier to present to the user at least one issuer among the one or more issues who have submitted the issuer bids.

In another aspect, a computer-implemented method for dynamic user/issuer pairing is provided, comprising:
sending transaction details and an account identifier to a plurality of issuer servers belonging to a corresponding plurality of issuers, the transaction details relating to a transaction initiated by a user and the account identifier identifying the user;
receiving issuer fee bids submitted by one or more issuers who have received the transaction details and the account identifier, the one or more issuers being those available to conduct the transaction; and
analyzing the issuer bids based on predetermined criteria associating with the account identifier to present to the user at least one issuer among the one or more issues who have submitted the issuer bids.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
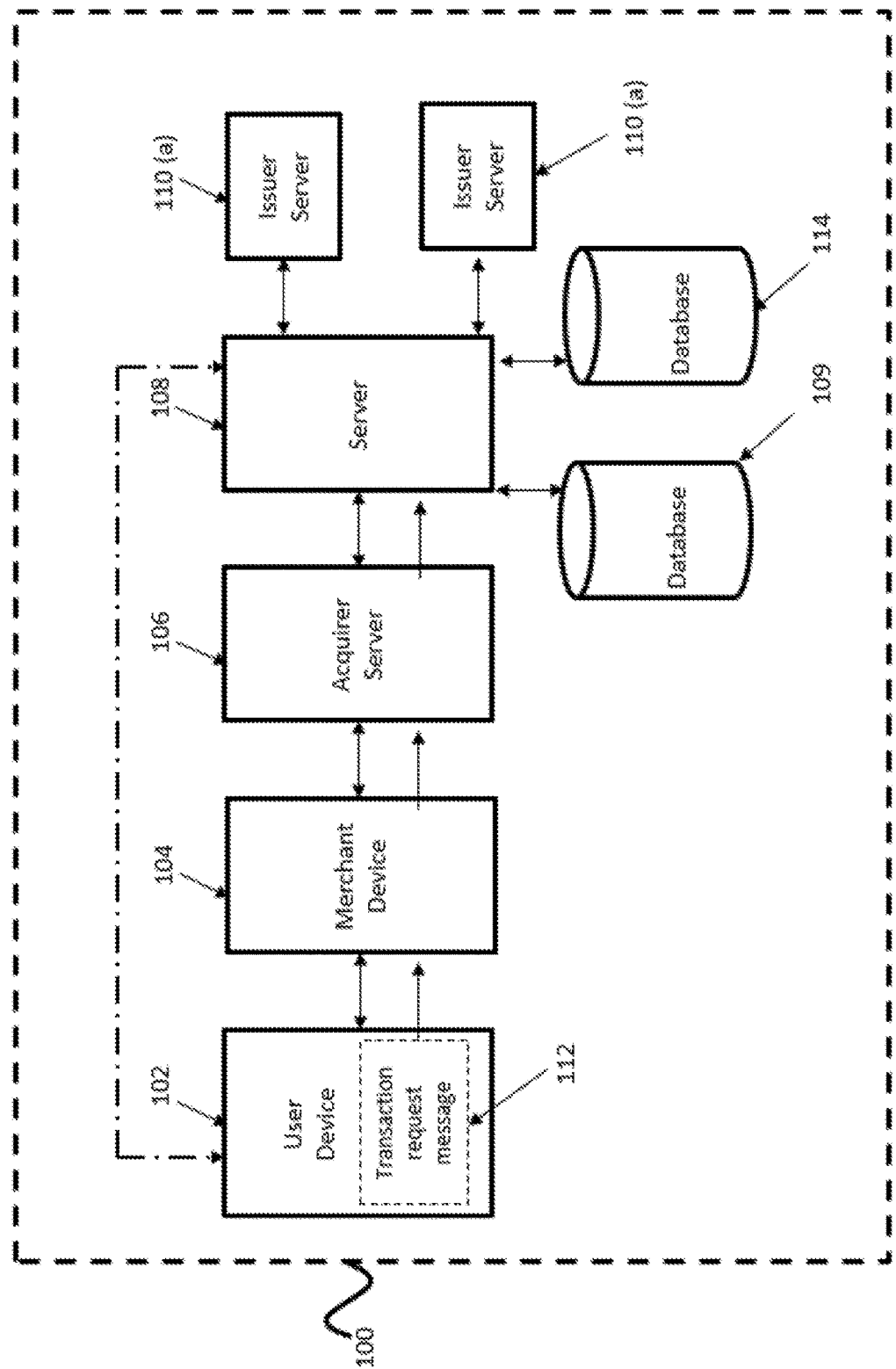
FIG. 1 shows a block diagram of a transaction system 100 within which transaction data and account identifier can be received.

Embodiments of the present invention will be described, by way of example only, with reference to the drawings.

Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "analysing", "determining", "replacing", "generating", "initializing", "outputting", "receiving", "retrieving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

In embodiments of the present invention, use of the term 'server' may mean a single computing device or at least a computer network of interconnected computing devices which operate together to perform a particular function. In other words, the server may be contained within a single hardware unit or be distributed among several or many different hardware units.

In the following description, a user (or a customer) may refer to one who has an account identifier. In specific embodiments, the account identifier may be linked to various financial institutions. For example, a user may sign up for a universal account so as to be linked to various financial institutions. The user is also a customer who initiates a transaction with a merchant. In one example, the user (or customer) may initiate the transaction with the merchant to buy goods and/or services from the merchant using his universal account. In an embodiment, the transaction is a payment transaction. In other words, effecting the transaction involves a payment between parties to the transaction.

FIG. 1 illustrates a block diagram of a transaction system 100 within which transaction data can be received.

The system 100 comprises a user device 102 in communication with a merchant device 104. The user device 102 may also be in direct communication with a payment network server 108, without having to communicate with the merchant device 104.

The merchant device 104 is in communication with an acquirer server 106. The acquirer server 106, in turn, is in communication with the payment network server 108 and the wallet-based network server 114. The payment network server 108, in turn, is in communication with an issuer server 110.

The user device 102 typically is associated with a customer (or user) who is a party to a transaction that occurs between the user device 102 and the merchant device 104 through a transaction. The user device 102 may be a fixed (wired) computing device or a wireless (portable) computing device. In specific implementations, the user device 102 may be a handheld or portable or mobile device carried or used by the customer, or may refer to other types of electronic devices such as a personal computer, a land-line telephone or an interactive voice response (IVR) system and the like. The mobile device may be a device, such as a mobile phone, a laptop computer, a personal digital computer (PDA), a mobile computer, a portable music player (such as an iPod™ and the like).

The merchant device 104 typically is associated with the merchant who is also a party to the transaction that occurs between the user device 102 and the merchant device 104 through the transaction. The merchant device 104 may be a point-of-sale (POS) terminal, an automatic teller machine (ATM), a personal computer, a computer server (hosting a website, for example), an IVR system, a land-line telephone, or any type of mobile device such as a mobile phone, a personal digital assistant (PDA), a laptop computer, a tablet computer and the like.

The acquirer server 106 generally is associated with an acquirer who may be an entity (e.g. a company or organization) which issues (e.g. establishes, manages, administers) a transaction credential or an account (e.g. a financial bank account) of the merchant. Examples of the acquirer include a bank and/or other financial institution. As stated in the above, the acquirer server 106 may include one or more computing devices that are used to establish communication with another server by exchanging messages with and/or passing information to the other server.

Figure 4:
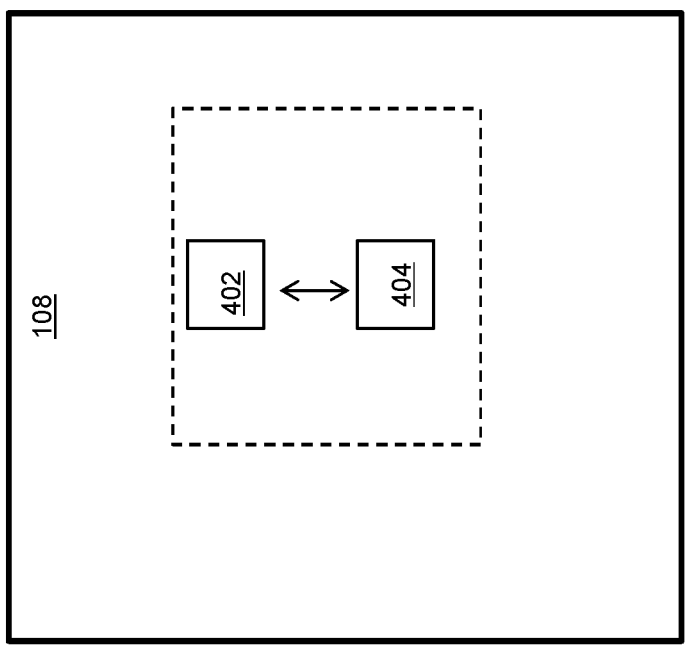
FIG. 4 shows an exemplary computing device to realize a server for the payment network server 108 shown in FIG. 1.

The payment network server 108 typically is associated with a payment facilitator. For example, the payment network server 108 may be the Banknet® network operated by MasterCard®. The payment facilitator (e.g. MasterCard®) may be an entity (e.g. a company or organization) who operates to process transactions, clear and settle funds for payments between two entities (e.g. two banks). The payment network server 108 may include one or more computing devices that are used for processing transactions. An exemplary payment network server 108 is shown in FIG. 4.

The issuer server 110 generally is associated with an issuer and may include one or more computing devices that are used to perform a payment transaction. The issuer may be an entity (e.g. a company or organization) which issues (e.g. establishes, manages, administers) a transaction credential or an account (e.g. a financial bank account). An account may be associated with a plurality of user devices 102.

The payment network server 108 may be configured to communicate with, or may include, a database (or a transaction database) 109. The transaction database 109 stores data corresponding to a transaction (or transaction data). Examples of the data include Transaction ID, Merchant ID, Merchant Name, MCC/Industry Code, Industry Description, Merchant Country, Merchant Address, Merchant Postal Code, Aggregate Merchant ID. For example, data ("Merchant name" or "Merchant ID") relating to the merchant, time and date for which the goods/services relating to the transaction will be delivered are included in the database 109. The database 109 may include a reliability score for each user indicating how reliable the user is. One of the criteria to determine how reliable the user is whether or not the user has settled the transactions within a predetermined time period. For example, if the user has paid an amount indicated in a monthly statement.

In other embodiments, the payment network server 108 may also be configured to communicate with, or may include, another database 114. The database 114 may include data corresponding to a user. Examples of the data include name, age group, income group, address, gender or the like relating to the payment card user. Other examples of the data include details concerning payments that are made for the transactions which determine financial credibility of the user. Further details on how these data are managed are described in FIG. 2 below.

The user device 102 is capable of wireless communication using a suitable protocol with the merchant device 104. For example, embodiments may be implemented using user devices 102 that are capable of communicating with Wi-Fi/Bluetooth-enabled merchant devices 104. It will be appreciated by a person skilled in the art that depending on the wireless communication protocol used, appropriate handshaking procedures may need to be carried out to establish communication between the user device 102 and the merchant device 104. For example, in the case of Bluetooth communication, discovery and pairing of the user device 102 and the merchant device 104 may be carried out to establish communication.

In an example, during a transaction, a transaction request message 112 is generated at the user device 102. The transaction request message 112 is generated by the user device 102 in response to the customer (or account user) making a selection of a good and/or service to be purchased from the merchant. In other words, the transaction request message 112 relates to a transaction between the user and the merchant. The transaction may be performed via a website of the merchant. In specific implementations, the user device 102 may be fitted with a wireless communications interface such as a Near Field Communication (NFC) interface to enable the user device 102 to electronically communicate with the merchant device 104 to perform the transaction. NFC is a set of standards to establish radio communication between devices by bringing them into close proximity such as only a few centimetres. NFC standards cover communication protocols and data exchange formats, and are based on radio-frequency identification (RFID) technology.

The transaction request message 112 may include an account identifier identifying a user, user data, a type of transaction and transaction data. For example, a user may fill in payment data at a website hosted by a merchant via the internet. The user may fill in the account identifier and the transaction data (or details). The account identifier may refer to various types of accounts that are administered by one or more issuers, which can be used by the user. The user data may include the name of the user and the date of expiry of the account (if applicable).

The account identifier refers to a number of digits (or characters) which identify a universal account issued by an institution (for example, MasterCard™). For example, in some embodiments, a universal account is linked to an account which is issued by an issuer pursuant to the MasterCard International Incorporated rules, and the account identifier may be a twelve to nineteen-digit string that identifies both the issuer (which may be based on the first few digits of the string, for example, the first five to ten digits) and the client account at the issuer. The account identifier may also identify if the issuer is subscribed to a standardized Internet transaction protocols such as 3-D Secure™ Network. The 3-D Secure™ Network is consistent with and underlies the authentication programs offered by card issuers (for example, SecureCode™ by MasterCard) to authenticate client for merchant during a remote transaction such as those done over the Internet. The account identifier is typically utilized to route and process transactions that involve the universal account or those it is linked to. Those skilled in the art will appreciate that other account schemes and formats may be used in conjunction with embodiments described herein.

In other words, each transaction data relates to a transaction and identifies the user and the merchant, generally by way of identifiers of each associated with the user and merchant respectively. Further, the transaction data may also identify the good and/or service to be purchased and a type or nature of the transaction. The transaction data may further identify a value or price of the good and/or service (e.g., a transaction amount) and a location where the good and/or service will be delivered. The transaction data may also indicate a time and date at which the transaction was initiated by the user.

The following types of information may be considered linked to an account identifier:
Personal information:—
  Location
  Interest
  Preferred amount to pay for a transaction fee
Past transaction information:—
  Details of issuers with whom the user has effected transactions
  Details of transaction fees that the user has paid
  Details of the time taken by the user to pay for the transaction
Payment Information:—
  Preferred payment mode
  User Group Code
  User Product Code
  User Product Description
  User Account Issuer Country User Account Identifier
User Account Issuer Name
User Account Issuer ID
User Account Issuer Name The personal information may be registered at the time of signing up for the universal account and this may be done at the time of setting up an account or through a registration or terminal. In other words, at the terminal, the user may register for an account, activate an account or ensure that notification messages are sent through his user device 102.

In an embodiment, the payment network server 108 is configured to process a request to sign up for the account and send a notification message to the user device 102 once it is determined that the account is set up. In an embodiment, the user device 102 may receive a short messaging service message to inform him about his account identifier.

In specific implementations, the payment network server 108 may also be configured to communicate with, or include, another database 114. The database 114 may be separate from the database 109. Alternatively, the database 114 may be included in the database 109. The database 114 stores information relating to a plurality of issuers and their corresponding issuer preference data for example, the types of transactions that they will carry out. In various embodiments, each of the issuer preference data comprises at least one of a transaction requirement, a payment threshold amount (or a minimum fee amount that the issuer is willing to accept), a type of transaction that the issuer accepts and an issuer threshold score which indicates the minimum reliability score that the issuer accepts.

As mentioned above, the role of the payment network server 108 is to facilitate communication between the user device 102 and the issuer server 110(a). Therefore, the payment network server 108 may serve as a means through which the user server 102 may communicate with the issuer server 110(a) in a manner that requests and bids may be accepted and forwarded.

In specific implementations, the payment network server 108 is further configured to perform additional operations. For example, the payment network server 108 may be configured to update the database 109 whenever a user registers for an account or settles his transactions. Additionally, the payment network server 108 may also be configured to calculate a reliability score for each user based on the historical transactions relating to the user.

Figure 2:
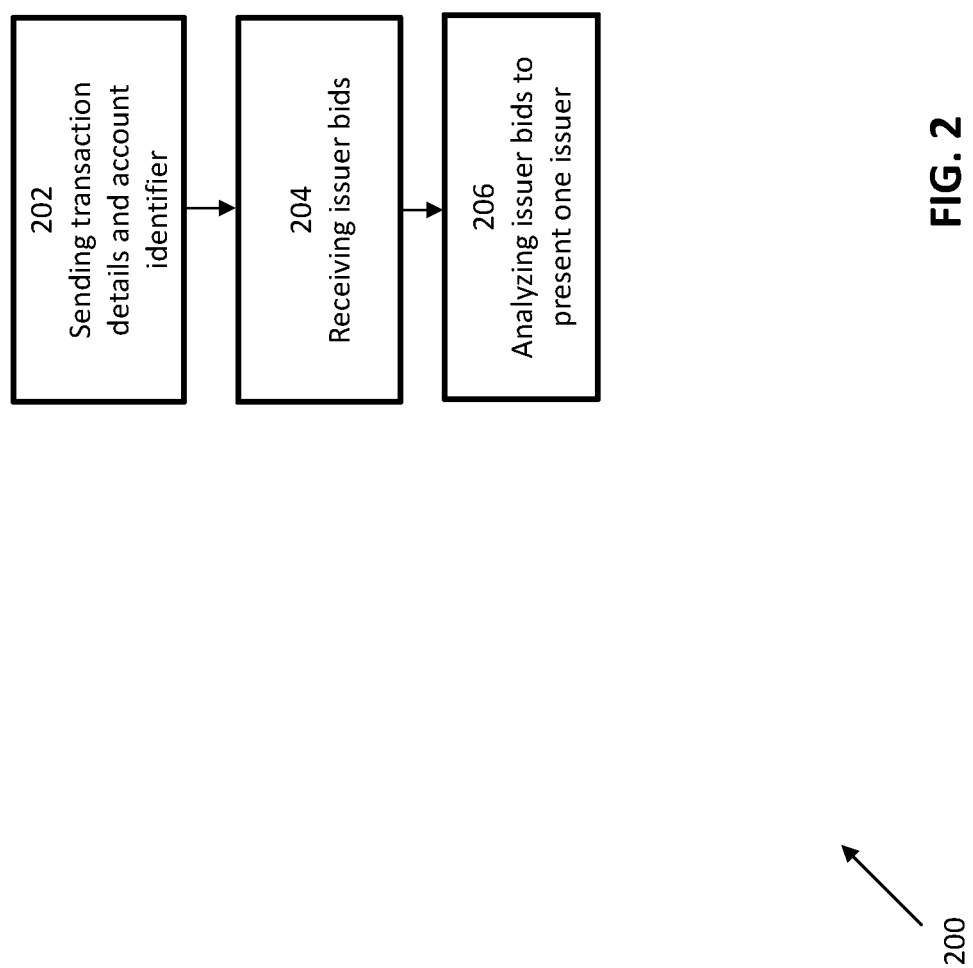
FIG. 2 shows a flow chart illustrating a computer-implemented method for dynamic user/issuer pairing according to an example embodiment.

Such a server may be used to implement the method 200 shown in FIG. 2. FIG. 2 shows a flowchart illustrating a method 200 for pairing dynamic user/issuer with embodiments of the invention. The method 200 can be used to present at least one issuer to a user. For various embodiments below, pairing of a user with an issuer with whom the user does not have an account.

The method 200 broadly includes:
step 202: Sending transaction detail and an account identifier to a plurality of issuer servers belonging to the plurality of issuers, the transaction details relating to a transaction initiated by a user, the account identifier identifying the user
step 204: Receiving issuer fee bids submitted by one or more issuers who have received the transaction details and the account identifier, the one or more issuers being those available to conduct the transaction;
step 206: Analyzing issuer bids based on predetermined criteria associating with the account identifier to present at least one issuer among the one or more issues who have submitted the issuer bids.

The method 200 may be performed by one or more purpose-built computing devices, such as the payment network server 108 that is coupled to one or more databases. At step 202, a transaction may be initiated by a user and a transaction request message 112 is generated. The transaction request message 112 comprises transaction details and an account identifier to a plurality of issuer servers belonging to a corresponding plurality of issuers. The transaction details relates to the transaction initiated by a user and the account identifier identifying the user. The transaction details include at least a type of the transaction, for example, a retail-type of transaction. The account identifier relates to information corresponding to the user which includes, among other things, a reliability score of the user, a user transaction threshold amount. The user transaction threshold amount indicates a maximum amount that the user is willing to pay for a transaction fee that is typically charged by an issuer for processing a transaction. In an embodiment, the transaction details and the account identifier are sent to all issuers who subscribe to such a service.

In another embodiment, prior to step 202, a reliability score is generated for the user based on historical transactions that have been settled for the user. This step may be performed by determining whether the user has settled the transactions within a predetermined time period. For example, if the historical transactions are to be completed within one month from the time the invoice is generated; this step is performed to determine if the user completes the historical transaction which includes paying the issuer the transaction amounts corresponding to the historical transactions. When it is determined that the user has settled the one of the historical transactions within a predetermined time period, the reliability score is increased.

In an embodiment, the transaction details and the account identifier are sent to a plurality of issuers in response to a processing step. The processing step may include processing issuer preference data corresponding to each of the plurality of issuers, the issuer preference data indicates a type of transaction that each issuer would like to conduct. The issuer preference data is then compared with the transaction details to determine if a type of the user-initiated transaction matches that indicated in the issuer preference data. In an embodiment, the transaction details are only sent to the plurality of issuer servers belonging to the plurality of issuers whose issuer preference data match the type of the user-initiated transaction. For example, if the issuer preference data indicates that the issuer is willing to conduct a retail-type of transaction and the user-initiated transaction relates to a retail-type.

At step 204, issuer fee bids are received. The issuer fee bids are submitted by one or more issuers who have received the transaction details and the account identifier, the one or more issuers being those available to conduct the transaction.

At step 206, the issuer bids are analyzed based on predetermined criteria associating with the account identifier to present at least one issuer among the one or more issues who have submitted the issuer bids. Each of the issuer bids may include a corresponding issuer threshold score representing the minimum reliability score that the issuer may accept. Alternatively or additionally, each of the issuer bids may include a minimum transaction fee that the issuer is willing to accept.

The analyzing step may include processing issuer preference data corresponding to each of the plurality of issuers, the issuer fee amount (indicated in a corresponding issuer fee bid) indicating a minimum transaction fee that the issuer is willing to accept. The issuer fee amount is then compared with the user threshold amount to determine if the user threshold amount is equal to or more than an issuer fee amount. In an embodiment, the transaction details are only sent to the plurality of issuer servers belonging to the plurality of issuers when it is determined that the user threshold amount is equal to or more than an issuer fee amount.

Additionally or alternatively, the analyzing step may include processing each of the issuer threshold score corresponding to issuer fee bids to determine if the reliability score is equal to or more than an issuer threshold score indicated in a corresponding issuer fee bid. In an embodiment, the issuer is presented to the user if it is determined that the reliability score of the user is equal to or more than the issuer threshold score. In other words, the issuer is willing to process a transaction with the user.

In an embodiment, the plurality of issuers are those who a holder (owner) of the account identifier does not have an account. In an embodiment, the method comprises receiving a user-selection effecting the transaction with the presented issuer.

Figure 3:
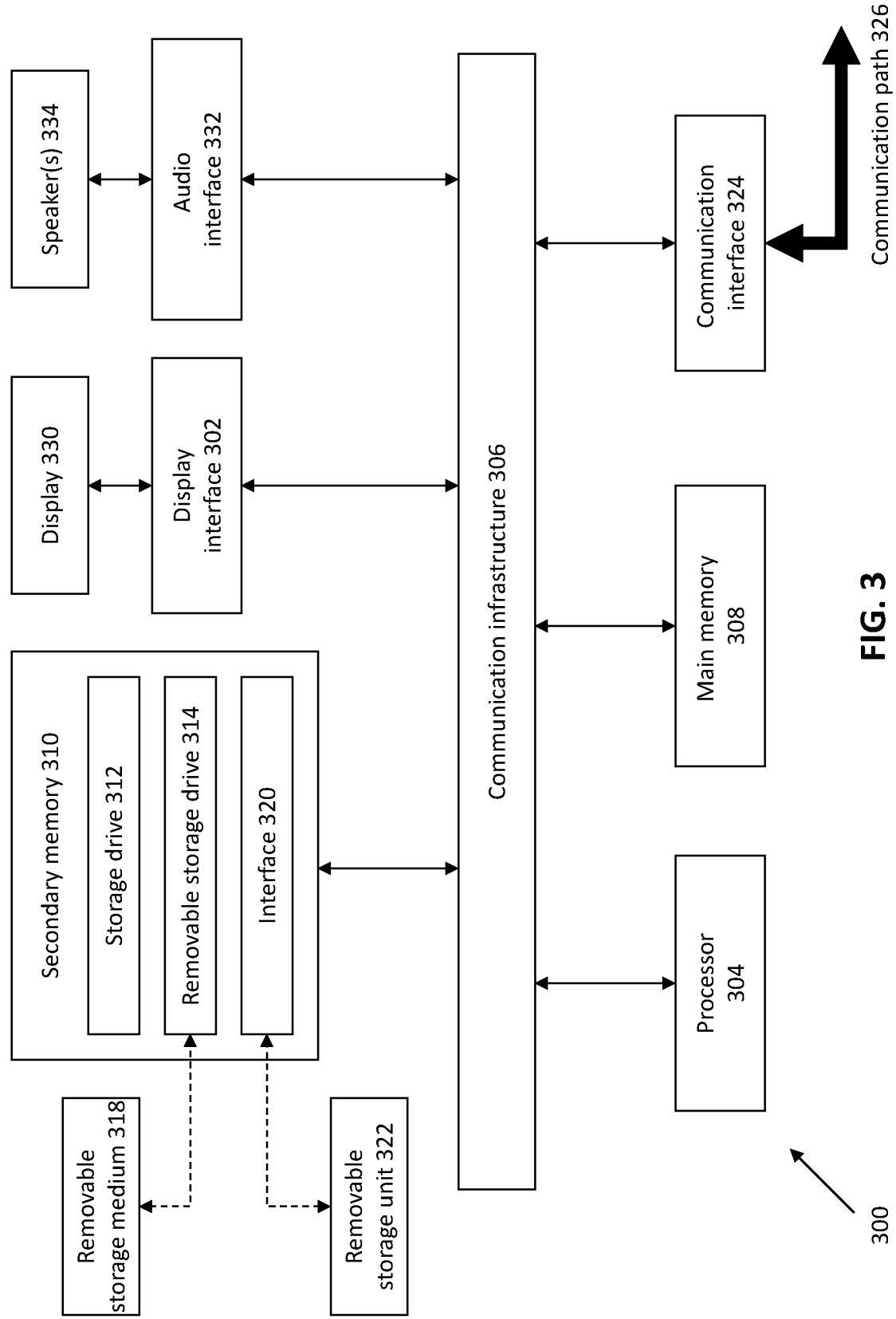
FIG. 3 shows a schematic diagram of a computer system suitable for use in executing the method depicted in FIG. 2.

FIG. 3 depicts an exemplary computer/computing device 300, hereinafter interchangeably referred to as a computer system 300, where one or more such computing devices 300 may be used to facilitate execution of the above-described method. In addition, one or more components of the computer system 300 may be used to realize the computer 302. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 400. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 344 in a well-known manner. The removable storage medium 344 may include magnetic tape, optical disk, non-volatile memory storage medium, or the like, which is read by and written to by removable storage drive 314. As will be appreciated by persons skilled in the relevant art(s), the removable storage medium 344 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 340. Examples of a removable storage unit 322 and interface 340 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 340 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port (such as a serial, parallel, printer, GPIB, IEEE 1394, RJ25, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage medium 344, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 300 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 400 using the removable storage drive 314, the storage drive 312, or the interface 340. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

In an implementation, the payment network server 108 may be generally described as a physical device comprising at least one processor 402 and at least one memory 404 including computer program code. The at least one memory 404 and the computer program code are configured to, with the at least one processor 402, cause the physical device to perform the operations described in FIG. 2. An example of the payment network server 108 is shown in FIG. 4.

For example, the method of FIG. 2 may be implemented as software and stored in a non-transitory fashion in the secondary memory 310 or the removable storage units 318, 322 of the computer device 300.

It will be appreciated by a person skilled in the art that numerous variations and/or modifications may be made to the present invention as shown in the specific embodiments without departing from the spirit or scope of the invention as broadly described. For example, the above description mainly discusses the use of a Bluetooth connection, but it will be appreciated that another type of secure wireless connection, such as Wi-Fi, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

What is claimed is:

1. An apparatus for setting a dynamic user/issuer pairing, the apparatus comprising:
    at least one processor; and
    at least one memory including computer program code;
    the at least one memory and the computer program code configured to, with the at least one processor, cause the apparatus to perform a process to dynamically pair a user of a user device with at least one issuer, the process comprising:
        in response to an initiation of a transaction by the user, accessing a memory comprising information relating to historical prior transactions that have been settled for the user and generating a reliability score for the user based on the historical prior transactions;
        identifying the at least one issuer to present to the user to facilitate the initiated transaction for the user, wherein the identification of the at least one issuer comprises:
            transmitting a message comprising transaction details for the initiated transaction and an account identifier to a plurality of issuer servers belonging to a corresponding plurality of issuers based on issuer preference data for the plurality of issuer servers, the account identifier identifying the user, and a user transaction threshold amount indicating a maximum amount that the user is to pay for a transaction fee;
            receiving issuer fee bids from one or more servers of the plurality of issuer servers submitted by one or more issuers who have received the transaction details and the account identifier, the one or more issuers being those available to conduct the initiated transaction, the one or more issuer fee bids indicating a minimum allowed reliability score for the user for each of the one or more issuers;
            analyzing the issuer fee bids based on predetermined criteria associated with the account identifier and on the reliability score, the analyzing the issuer fee bids comprising determining whether the reliability score is equal to or more than an issuer threshold score indicated in a corresponding issuer fee bid and presenting the issuer if it is determined that the reliability score is equal to or more than the issuer threshold; and
            generating and transmitting one or more messages to the user device to present to the user at least one issuer among the one or more issuers who have submitted the issuer bids at least partially in response to the reliability score for the user being greater than or equal to the minimum allowed reliability score for the at least one issuer.

2. The apparatus according to claim 1, wherein the at least one memory and the computer program code is further configured with the at least one processor to:
    process issuer preference data indicating a type of transaction that each issuer would like to conduct;
    compare the issuer preference data to determine if a type of the transaction match that indicated in the issuer preference data;
    wherein the transaction details are sent to the plurality of issuer servers belonging to the plurality of issuers whose issuer preference data match the type of the transaction.

3. The apparatus according to claim 1, wherein the at least one memory and the computer program code is further configured with the at least one processor to:
    determine if a user transaction threshold amount is equal to or more than an issuer fee amount indicated in a corresponding issuer bid; and
    present the issuer if it is determined that the user transaction threshold amount is equal to or more than the issuer fee amount.

4. The apparatus according to claim 1, wherein the at least one memory and the computer program code is further configured with the at least one processor to:
    receiving a user-selection effecting the initiated transaction with the presented issuer.

5. The apparatus according to claim 1, wherein the at least one memory and the computer program code is further configured with the at least one processor to:
    determine whether the user has settled the historical prior transactions within a predetermined time period.

6. The apparatus according to claim 5, wherein the at least one memory and the computer program code is further configured with the at least one processor to:
    increase the reliability score when it is determined that the user has settled the one of the historical prior transactions within a predetermined time period.

7. The apparatus according to claim 1, wherein the plurality of issuers being those with whom a holder of the account identifier does not have an account.

8. A computer-implemented method for dynamic user/issuer pairing, the method comprising:
  in response to an initiation of a transaction by a user of a user device, accessing a memory comprising information relating to historical prior transactions that have been settled for a user and generating a reliability score for the user based on the historical prior transactions;
  performing a process to dynamically pair the user with at least one issuer, the performing of the process including identifying the at least one issuer to present to the user to facilitate the initiated transaction for the user, wherein the identification of the at least one issuer comprises:
    sending transaction details for the initiated transaction and an account identifier to a plurality of issuer servers belonging to a corresponding plurality of issuers based on issuer preference data for the plurality of issuer servers, the account identifier identifying the user, and a user transaction threshold amount indicating a maximum amount that the user is to pay for a transaction fee;
    receiving issuer fee bids from one or more servers of the plurality of issuer servers submitted by one or more issuers who have received the transaction details and the account identifier, the one or more issuers being those available to conduct the initiated transaction, the one or more issuer fee bids indicating a minimum allowed reliability score for the user for each of the one or more issuers;
    analyzing the issuer fee bids based on predetermined criteria associated with the account identifier and on the reliability score, the analyzing the issuer fee bids comprising determining whether the reliability score is equal to or more than an issuer threshold score indicated in a corresponding issuer fee bid and presenting the issuer if it is determined that the reliability score is equal to or more than the issuer threshold; and
    generating and transmitting one or more messages to the user device to present to the user at least one issuer among the one or more issuers who have submitted the issuer bids at least partially in response to the reliability score for the user being greater than or equal to the minimum allowed reliability score for the at least one issuer.

9. The method according to claim 8, wherein the step of sending the transaction details and the account identifier comprises:
  processing issuer preference data indicating a type of transaction that each issuer would like to conduct;
  comparing the issuer preference data to determine if a type of the transaction match that indicated in the issuer preference data;
  wherein the transaction details are sent to the plurality of issuer servers belonging to the plurality of issuers whose issuer preference data match the type of the transaction.

10. The method according to claim 8, wherein the step of analyzing the issuer fee bids based on the predetermined criteria corresponding to the account identifier to present at least one issuer comprises:
  determining if a user transaction threshold amount is equal to or more than an issuer fee amount indicated in a corresponding issuer fee bid; and
  presenting the issuer if it is determined that the user transaction threshold amount is equal to or more than the issuer fee amount.

11. The method according to claim 8, further comprising receiving a user-selection effecting the initiated transaction with the presented issuer.

12. The method according to claim 8, wherein the step of generating the reliability score comprises:
  determining whether the user has settled the historical prior transactions within a predetermined time period.

13. The method according to claim 12, wherein the step of generating the reliability score comprises:
  increasing the reliability score when it is determined that the user has settled the one of the historical prior transactions within a predetermined time period.

14. The method according to claim 8, wherein the plurality of issuers being those with whom a holder of the account identifier does not have an account.

* * * * *